(12) United States Patent
Steinrück et al.

(10) Patent No.: US 7,124,998 B2
(45) Date of Patent: Oct. 24, 2006

(54) ELECTROMAGNETICALLY ACTUATED GAS VALVE

(75) Inventors: Peter Steinrück, Hallstatt (AT); Bernhard Spiegl, Vienna (AT); Karl Rein, Vienna (AT); Gerhard Ranegger, Graz (AT)

(73) Assignee: Hoerbiger ValveTec GmbH, Vienna (AT)

( * ) Notice: Subject to any disclaimer, the term of this patent is extended or adjusted under 35 U.S.C. 154(b) by 75 days.

(21) Appl. No.: 10/870,556

(22) Filed: Jun. 18, 2004

(65) Prior Publication Data

US 2005/0001191 A1   Jan. 6, 2005

(30) Foreign Application Priority Data

Jun. 18, 2003   (AT)   ................. A 953/2003

(51) Int. Cl.
*F16K 31/02*   (2006.01)
(52) U.S. Cl. .................. 251/129.21; 251/129.15
(58) Field of Classification Search .......... 251/129.15, 251/129, 21
See application file for complete search history.

(56) References Cited

U.S. PATENT DOCUMENTS

| | | | | |
|---|---|---|---|---|
| 2,041,922 A | * | 5/1936 | Green | .................. 137/486 |
| 3,701,480 A | * | 10/1972 | Kuhner et al. | ............. 239/420 |
| 4,641,427 A | * | 2/1987 | Shields | ................ 29/857 |
| 4,909,447 A | * | 3/1990 | Gallup et al. | ........... 239/585.3 |
| 5,611,204 A | * | 3/1997 | Radovanovic et al. | ..... 60/605.2 |
| 5,937,727 A | * | 8/1999 | Klesen et al. | ............. 91/367 |
| 6,161,813 A | * | 12/2000 | Baumgartner et al. | ........ 251/50 |
| 6,182,943 B1 | | 2/2001 | Steinrück et al. | |
| 6,189,519 B1 | * | 2/2001 | Press et al. | ............ 123/568.26 |
| 6,196,204 B1 | * | 3/2001 | Janach | ................ 123/527 |
| 6,230,991 B1 | | 5/2001 | Steinrück et al. | |
| 6,651,953 B1 | * | 11/2003 | Weldon | ............... 251/129.02 |

\* cited by examiner

*Primary Examiner*—Justine R. Yu
*Assistant Examiner*—Andrew J. Rost
(74) *Attorney, Agent, or Firm*—Dykema Gossett PLLC

(57) ABSTRACT

An electromagnetically actuated gas valve (5) for gas engines (4) includes a valve seat (13) that has at least one flow-through opening (14) and a corresponding sealing plate (15), with the sealing plate being movably arranged and guided essentially perpendicularly relative to the valve seat (13), with barrier surfaces (16) and discharge openings (17). The sealing plate (15) is loaded against the valve seat (13) by means of a return spring (25) and can be lifted for the purpose of opening it via a solenoid (21). In order to allow for the secure sealing and easy switchability even in the presence of the effect of the combustion chamber pressure, the sealing plate (15) is arranged on the discharge side of the valve seat (13) and connected by means of a stamp (29), which extends through the valve seat (13), with the anchor plate (28) of the solenoid (21). A Venturi tube meter (38) is arranged on the discharge side after the sealing plate (15) for the purpose of calibrating the flow-through correction value and for suppressing any dispersions due to manufacturing variations with regard to the effective flow cross-section, and the cross-section of the Venturi tube meter (38) is smaller than the sum of the effective flow-through cross-sections between valve seat (13) and opened sealing plate (15).

3 Claims, 2 Drawing Sheets

ELECTROMAGNETICALLY ACTUATED GAS VALVE

BACKGROUND OF THE INVENTION

1. Field of the Invention

The invention relates to an electromagnetically actuated gas valve, in particular for the fuel gas supply in gas engines including a valve seat that has at least one flow-through opening and a sealing plate, movably arranged and guided essentially perpendicularly relative to the valve seat, which has at least one discharge opening, arranged adjacent to a barrier surface that corresponds to the flow-through opening of the valve seat, in order to allow for the overall essentially linear flow-through of the fuel gas through the gas valve; the sealing plate is loaded against the valve seat by means of a return spring and can be lifted relative to the opening via a solenoid; and the flow-through opening of the valve seat has, in comparison with a circular surface of the same cross-section, a large sealing edge length; and the opening stroke of the sealing plate is small.

2. The Prior Art

Magnetically actuated injectors are usually employed for the direct allocation of liquid fuels to the combustion chambers of combustion engines, and they are generally configured in the way of a needle valve. This way, with the restricted mounting space that is available and the injector size that results because of this limitation, only very small switched flow diameters can be achieved which, however, allow for a sufficient metering performance to operate the machine thanks to the high energy density of the liquid fuel. But gaseous fuel, at the same injection pressure, requires a flow cross-section that is larger by a multiple value (for injection pressure $p1=200$ bar approximately by factor 5; for injection pressure $p1=5$ bar approximately by factor 20) and that can not be realized with the conventional needle valves. Moreover, needle valves have the disadvantage that they require a minimum amount of greasing for wear-and-tear-free operation, which does not take place during operation with gases, transported or stored in liquid form in the vehicle, due to the extremely low dew point.

In an effort to overcome the last referred to problem, seat valves have become known involving configurations that provide for the closing organ to be arranged orthogonally onto the corresponding valve seat, thereby ensuring that any friction movement between seat and closing organ is reliably avoided (refer to, e.g., U.S. Pat. No. 6,182,943). With the assistance of seat valves it is also possible to solve in a particularly simple way the above mentioned problem of the switching cross-sections that are too small. The embodiment that is discussed in the referred to patent, which envisions that the valve is configured with at least two concentric seat edges that are switchably covered with ring-shaped closing elements, allows for sufficiently large switching cross-sections while the construction space is small. The available valve surface can be utilized in a particularly favorable way if stroke and width of the circumferential slot located between the seat edges are selected at a ratio of width/stroke=approximately 2.

Gas injectors of the kind referred to above must exhibit extremely rapid reaction behavior in order to ensure that the necessary metering accuracy is achieved and a sufficiently large ratio between minimum and maximum fuel quantity that can be metered. Among the construction types that are known in the art for solenoids, it is pot magnets, featuring a magnetic coil containing an iron core of an E-shaped or U-shaped cross section juxtaposed by an essentially plain anchoring plate at a short distance, that exhibit very fast reaction behavior with simultaneously large magnetic force. But the high magnetic forces can only be realized at very small distances or air gaps, which means that the stroke available for switching the magnet is also very minimal. In conjunction with the optimal width/stroke ratio outlined above, it results that a particularly favorable embodied example of the known magnet-actuated ring plate valves features a very narrow slot width or radial division.

A special difficulty of the combustion process involving direct fuel allocation into the combustion chamber results from the circumstance that the injectors are exposed to the combustion pressure and the high combustion temperatures. The fuel supply must be safely sealed against the pressure inside the combustion cylinder even at high pressures. With very high fuel pressures that are in the order of magnitude of combustion peak pressures or above, this can be easily achieved in the context of known configurations of seat valves because of the type of actuation that is used there. In these valves, the fuel pressure and a return spring press the sealing element against the valve seat, and it is opened by means of the action of the solenoid acting against these closing forces. For fuel pressures that are considerably smaller than the anticipated combustion peak pressure, the pressure forces that engage across the pressure working surface of the sealed closing elements acting in the direction of the opening must be equalized with the assistance of a return spring that is designed with sufficient strength. The solenoid, on the other hand, must in turn overcome the sum of the closing forces that are acting for the duration of the time that is envisioned for the injection of the fuel during which generally only minimal cylinder pressure is applied. With lower fuel pressures, this task is difficult to achieve because the magnets that have the sufficient strength both with regard to construction volume as well as dynamic reaction behavior are not suitable.

An apparatus that is able to solve the problems referred to above has been disclosed, e.g., in U.S. Pat. No. 6,230,991. This apparatus contains a pressure equalization system that supplies the combustion pressure to a pressure-compensating piston. This way, it is possible to compensate for the compressive force that acts in the direction of the opening. But this embodiment has several disadvantages: the forces that are introduced from the pressure-compensating piston to the valve plate have the ability to effect an undesired deformation of the valve plate resulting in the partial opening of the valve translating into impermissible leakage. The high level of seal tightness that is required for the object constituting the subject-matter in the present context can, with regard to the characteristically high combustion pressures, only be achieved in terms of practical application with single-ring valves with, due to the construction type, minimal utilization of the available valve surface. Moreover, the problem emerges that combustion exhaust may penetrate into the pressure equalization system contaminating or clogging it. Consequently, it is no longer possible to ensure the proper functioning of the apparatus.

It is the object of the present invention to improve a gas valve of the kind referred to in the introduction in such a way that the problems and disadvantages of the known apparatuses of this kind that have been outlined here are avoided and that, in particular, the required extremely fast reaction behavior at high density and minimal needed assembly space will continue to be ensured.

SUMMARY OF THE INVENTION

This object is solved according to the present invention with a gas valve of the kind referred to above in that the sealing plate is arranged on the discharge side of the valve seat in a manner that is known in the art and connected to a stamp that is guided in a longitudinal direction extending through the valve seat and the solenoid, with the solenoid being arranged on the incoming flow side before the valve seat; and the stamp carries an anchor plate acting in conjunction with the solenoid on its end that is directed away from the sealing plate; and a Venturi tube meter is arranged after the sealing plate on the discharge side featuring a cross-section which is smaller than the sum of the effective flow-through cross-sections between valve seat and opened sealing plate. The movable sealing plate is thus arranged on the side of the valve seat that is directed toward the combustion chamber, pulled and closed against the seat by the return spring counteracting the pressure of the supplied fuel gas. The direction of action of the solenoid, that controllably opens the valve, is reversed relative to the mentioned known embodied examples, whereby the combustion pressure acting from the combustion chamber is absorbed by the sealing plate and transferred by the sealing plate to the valve seat. This way, the combustion pressure is utilized in order to improve the sealing between combustion chamber and fuel gas supply.

The closing force of the return spring can be easily and advantageously adjusted to the fuel gas pressure in this context so that the solenoid only has to overcome small resulting forces for opening. The preferably used pot magnet supplies very high forces in the pulled-in position, i.e., with a minimal residual air gap, thereby allowing the counter-pressure on the side of the combustion chamber indeed to rise while the valve is opened without the valve closing prematurely or inadvertently. Consequently, thanks to the large cross-sections that can be controlled in the manner described, a very compact construction type with small required magnetic forces results which makes it possible to use the gas valve according to the invention also in relatively small gas engines ranging all the way to passenger car driving engines.

The arrangement of the sealing plate on the discharge side of the valve seat and its actuation via a stamp that is guided in a longitudinal direction extending through the valve seat and the solenoid, that is arranged on the incoming flow side before the former, and the stamp carrying on its other end, which is directed away from the sealing plate, an anchor plate acting in conjunction with the solenoid, is in fact known in the art, for example, from U.S. Pat. No. 6,189,519 in connection with a valve for controlling discharge gas recirculation from motor vehicle driving engines; though applications of this kind are more likely having to struggle with temperature and contamination problems than with accuracy requirements with regard to the flow-through quantity, as it is naturally the case with gas valves of the type according to the invention. It is for this reason that the arrangement of the Venturi tube meter with a certain relative cross-section is essential in the context of the present invention, because it allows for the very easy calibration of the flow-through correction value of the gas valve and of the entire injector; the dispersions due to manufacturing variations are only of secondary importance for the total flow-through behavior relative to the effective flow cross-section of the switching element.

Even though the gas valve according to the invention can also in principle be configured with flow-through openings of the valve seat featuring meandering-shaped nesting or of a grate or spiral type, for construction-specific reasons a preferred embodied example provides a valve seat with at least two concentrically arranged, essentially ring-shaped flow-through openings that can be closed off by the corresponding barrier surfaces of the sealing plate and that allow in the open state of the gas valve for a discharge across essentially ring-shaped, concentrically arranged discharge openings of the sealing plate. Therefore, with regard to the realization of the flow-through openings and the corresponding barrier surfaces and discharge openings, there results a similar realization as in U.S. Pat. No. 6,182,943 that was referred to previously, allowing for the simple and robust design of the barrier elements acting in conjunction.

It is possible to envision only a centrally arranged stamp that is axially guided in sliding bearings for the transfer of the switching movement of the anchor plate acting in conjunction with the solenoid, thereby allowing for simple and precise guiding and valve actuation. The return spring can be configured, for example, as a spiral-shaped compression spring arranged concentrically relative to the stamp in a central recess of the solenoid or magnet carrier and supported on the one side inside this recess while supported on the other side on the anchoring plate, resulting overall in a simple and symmetrical valve design.

On the discharge side, after the Venturi tube meter, it is possible, in a further embodied example, to arrange a Laval nozzle in series that extends to the opening, in particular, in an effort to improve the utilization of the internal energy of the supplied fuel gas and to achieve a stream impulse that is as large as possible for the better homogenization of the combustible mixture.

A further embodied example of the invention provides for integrating a springy stop into the solenoid or magnet carrier in order to effect a stroke limit of the sealing plate; it is preferably worked together with the end surfaces of the magnet legs allowing for the possibility of minimizing the tolerance errors that are responsible for the residual air gap of the solenoid.

It is possible to envision in a further embodied example at least one spacer for the stroke adjustment of the sealing plate. The spacer is arranged between valve seat and solenoid or magnet carrier.

The invention will be illustrated in further detail using the in part schematically depicted embodiments in the drawings.

DETAILED DESCRIPTION OF THE PREFERRED EMBODIMENTS

Figure 1:
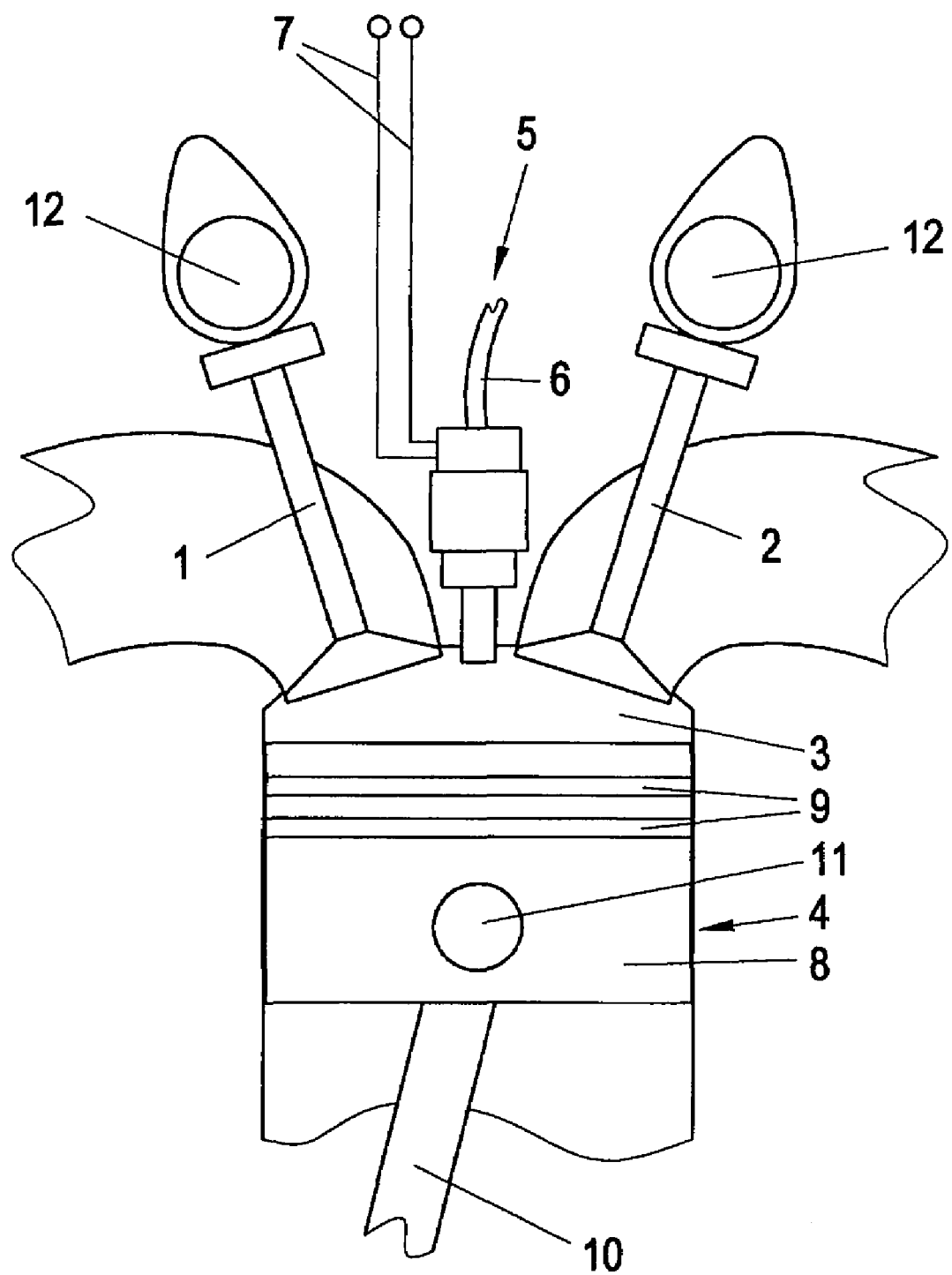
FIG. 1 shows, correspondingly, a gas valve according to the invention that is mounted inside the combustion chamber of a gas engine.

In accordance with FIG. 1, a gas valve 5 is used between intake valve and exhaust valve 1,2 on the upper limit of the combustion chamber 3 of a gas engine 4, that is only schematically hinted at, for the purpose of the clocked import of fuel gas that is supplied via the line 6. The electrical connection lines 7 are used, if necessary, for activating the electromagnetic actuation of the gas valve 5 whereupon the valve is opened against the force of a return spring—for details, refer to FIG. 2 of the following description.

Only for reasons of completeness of FIG. 1, reference is being made also to the reciprocating piston 8 including piston ring 9, connecting rod 10, and piston pin 11 as well as the camshafts 12 that are provided at the top for the actuation of the valves 1,2.

Figure 2:
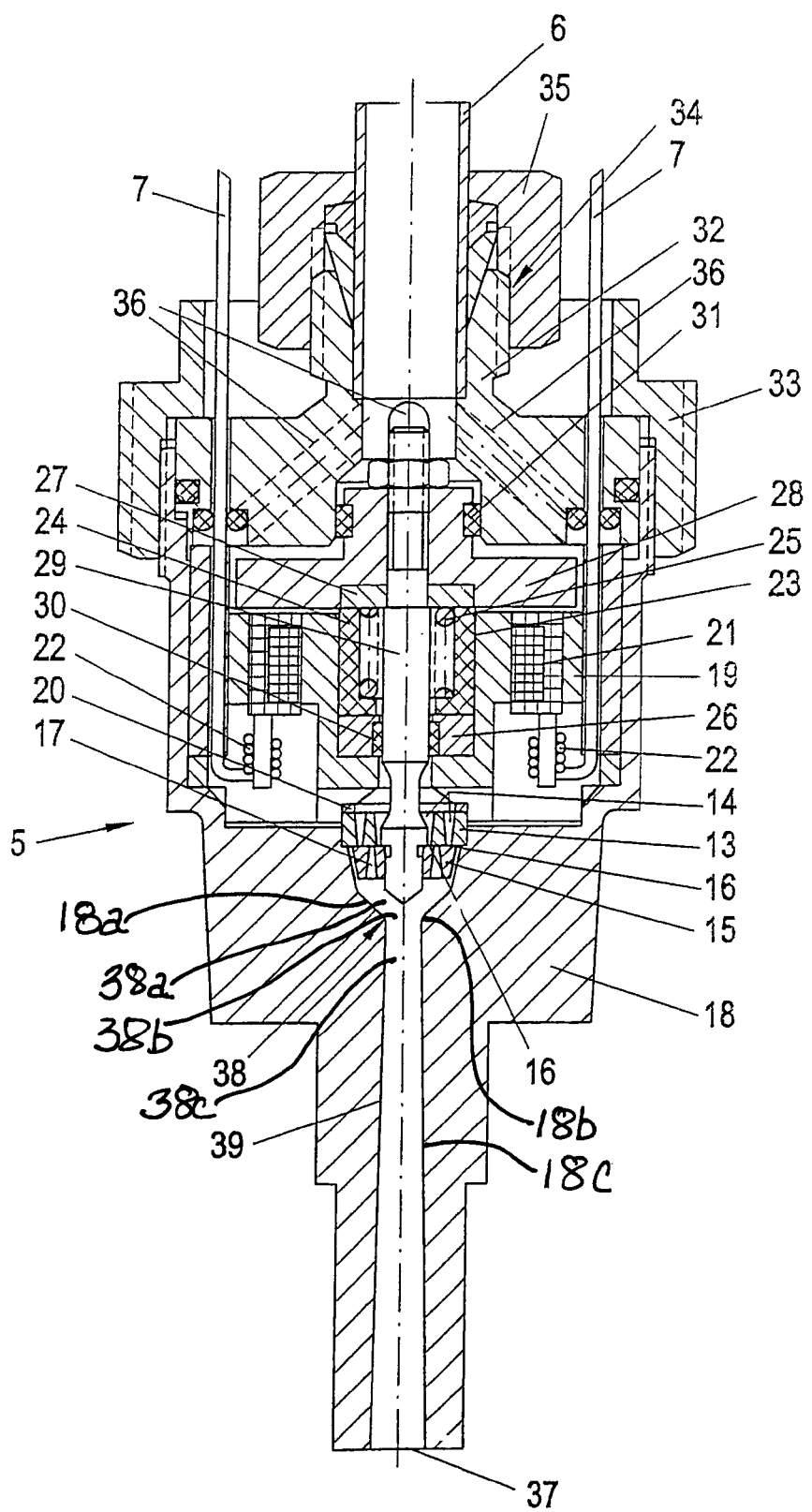
FIG. 2 shows a longitudinal section of another embodiment of a gas valve according to the invention.

The gas valve 5 has, in accordance with FIG. 2, a valve seat 13 with two concentrically arranged, essentially ring-shaped flow-through openings 14 and a movable sealing plate 15 that is guided perpendicularly relative to the valve seat 13. The sealing plate 15 comprises a middle ring-shaped exhaust opening 17 between barrier surfaces 16 that correspond to the flow-through openings 14 of the valve seat 13—a further exhaust opening is realized on the outer edge of the sealing plate 15 with the wall of the valve housing 18.

The valve seat is inserted into an expansion of the valve housing 18 and is held in place, as seen in the depiction, from above via the magnet carrier 19, while, using a spacer 20 as an intermediate layer, it is possible to adjust the stroke height of the sealing plate 15. The magnet carrier 19 is inserted from above into the valve housing 18 having a solenoid 21, and the solenoid being realized as a pot magnet, which is contacted via crimped contacts 22 with the connection lines 7 to the outside. Moreover, an elastic sleeve 24 is inserted into a central recess 23 which houses a return spring 25 that is configured as a spiral compression spring. This return spring 25 is thus supported on its lower side on the magnet carrier 19 or on the guide sleeve 26 that is inserted into the recess 23, and it engages on the other side on the anchor plate 28 via a pressure plate 27. The anchor plate 28, that is attracted by the solenoid 21 upon activation of the solenoid, is fastened to, as depicted in the drawing, the upper end of a centrally arranged stamp 29, with the stamp carrying on its lower end the sealing plate 15, which is thus closed due to the effect of the return spring 25 and can be opened when the solenoid 21 is activated against the force of the return spring 25. The possible opening stroke is in this context determined by the residual gap between pressure plate 27 and the upper end of the elastic sleeve 24, which thereby also serves as a fixed stop absorber.

The movement of the stamp 29 in the axial direction is guided in sliding bearings 30, 31—on the one hand, in the guide sleeve 26 and, on the other hand, at the upper end of the anchor plate 28. The upper sliding bearing 31 is guided inside a central recess of a lid 32 which is connected to the valve housing 18 via coupling nut 33 and additionally fastens the magnet carrier 19 in place inside the valve housing. This lid 32 centrally supports the gas connection 34 connected to which is, in sealed fashion via coupling nut 35, the line 6 of the gas supply. On its inside, lid 32 features, distributed in the shape of a cross, four bore holes 36, and through the bore holes the supplied fuel gas reaches the inside of the valve and ultimately the valve seat 13. Viewed overall, in essence a linear flow-through results from the point of the gas connection 34 to the discharge opening 17 or to the mouth 37 of the gas valve 5.

A Venturi tube meter 38 is configured on the discharge side after the sealing plate 15 the cross-section of which is smaller than the sum of the effective flow-through cross-sections between valve seat 13 and opened sealing plate 15, which means that any dispersion due to manufacturing variations relative to the effective flow cross-section of the switching element is of secondary importance for the total flow-through behavior, and the calibration of the flow-through correction value is generally very simple. To provide the Venturi tube meter 38, the valve housing 18 defines converging walls 18a that provide a converging zone 38a, a neck 18b that provides a throat 38b, and diverging walls 18c that provide an expansion zone 38c, e.g., a Laval nozzle. The Laval nozzle extends to the mouth 37, thereby improving the utilization of the internal energy of the supplied fuel gas and allowing for a stream impulses that is as large a possible for a better homogenization of the fuel mixtures.

As a consequence of the displayed and discussed apparatus of the sealing plate 15 on the discharge side of the valve seat 13 and the special magnet actuation by way of the stamp 29 that penetrates the solenoid 21, it is possible to advantageously use the internal combustion chamber pressure acting from the direction of the mouth 37 or from the combustion chamber (3 in FIG. 1) for the support of the sealing of the valve seat 13 by means of the sealing plate 15. To open the sealing plate 15, it is necessary for the solenoid to overcome the compressive force that is acting upon the sealing plate 15 from the direction of the combustion chamber as well as the force that is exercised by the return spring 25, while the force that is acting in the opening direction of the sealing plate 15 is supplied by the pressure of the fuel gas via line 6. This way, it is possible to advantageously exercise influence over the magnetic force that is actually needed, which means that even very small solenoids 21 can be used. As a consequence of the large switchable cross-section of the flow-through openings 14, it is also possible to work with small opening strokes thereby ensuring an advantageous fast switching movement with small magnet gaps. In total, it is therefore possible to design the gas valve according to the invention with very small dimensions that will allow implementation also in the context of relatively small gas engines.

The invention claimed is:

1. An electromagnetically-actuated fuel gas supply valve for controlling flow of fuel gas from a fuel gas line to a combustion chamber of a gas engine, said fuel gas supply valve comprising;
   a gas connection at a first end for attachment to an end of the fuel gas line and a Venturi tube meter at an opposite second end for communication with the combustion chamber of the gas engine, a valve seat located between said first and second ends, said valve seat defining at least one flow through opening, an elongated stamp which extends through said valve seat and is longitudinally movable, a sealing plate which is attached to said stamp between said valve seat and said second end of said valve to be perpendicularly movable toward and away from a barrier surface of said valve seat, said sealing plate including at least one discharge opening for delivering fuel gas therethrough to said Venturi tube meter,
   an anchor plate in said valve between said first end and said valve seat,
   a solenoid in said valve between said anchor plate and said valve seat to move said stamp and sealing plate,
   said Venturi tube meter having converging walls zone, a neck and diverging walls forming an expansion zone, and having a cross-section which is smaller than the sum of effective flow through cross-sections between the valve seat and opened sealing plate.

2. Fuel gas supply valve as claimed in claim 1, wherein, serving as a stroke limit of the sealing plate an elastic sleeve is integrated in the solenoid or a magnet carrier that is worked together with end surfaces of magnet legs.

3. Fuel gas supply valve as claimed in claim 2, wherein at least one spacer is located between the valve seat and solenoid or the magnet carrier for the stroke adjustment of the sealing plate.

* * * * *